(12) United States Patent
Foster

(10) Patent No.: US 9,458,766 B2
(45) Date of Patent: Oct. 4, 2016

(54) BLIND INSTALLATION PIN FOR A GAS TURBINE ENGINE MOUNT

(71) Applicant: United Technologies Corporation, Hartford, CT (US)

(72) Inventor: Joseph P. Foster, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 240 days.

(21) Appl. No.: 14/140,061

(22) Filed: Dec. 24, 2013

(65) Prior Publication Data

US 2014/0173881 A1 Jun. 26, 2014

Related U.S. Application Data

(60) Provisional application No. 61/745,732, filed on Dec. 24, 2012.

(51) Int. Cl.
| | | |
|---|---|---|
| *F16B 21/00* | (2006.01) | |
| *F02C 7/20* | (2006.01) | |
| *F16B 19/10* | (2006.01) | |
| *F16B 21/10* | (2006.01) | |
| *F16B 13/08* | (2006.01) | |
| *B64D 27/26* | (2006.01) | |

(52) U.S. Cl.
CPC .............. *F02C 7/20* (2013.01); *F16B 19/1045* (2013.01); *F16B 21/10* (2013.01); *B64D 2027/262* (2013.01); *F16B 13/0833* (2013.01); *Y10T 29/49948* (2015.01)

(58) Field of Classification Search
CPC ...... F02C 7/30; F16B 19/1045; F16B 21/10; F16B 21/00; F16B 21/02
USPC .................. 411/344, 439, 347, 351, 356; 403/322.1; 244/54
See application file for complete search history.

(56) References Cited

U.S. PATENT DOCUMENTS

| | | | | |
|---|---|---|---|---|
| 4,465,039 A * | 8/1984 | Snelgrove | ............... | F02N 19/02 123/142.5 E |
| 4,693,389 A * | 9/1987 | Kalen | .................. | G21C 13/067 138/89 |
| 5,295,165 A * | 3/1994 | Hankinson | ........... | G21C 13/067 138/89 |
| 5,417,531 A * | 5/1995 | Brown | ...................... | E05F 5/06 29/525.01 |
| 5,991,984 A * | 11/1999 | Schaty | ................. | F16B 13/0808 24/609 |
| 8,132,435 B2 * | 3/2012 | Thomas | .............. | E05B 65/0021 24/458 |
| 8,523,909 B2 * | 9/2013 | Hess | .................. | A61B 17/7065 606/248 |
| 8,807,900 B2 * | 8/2014 | Ramsauer | ............... | E05B 9/084 411/347 |

\* cited by examiner

*Primary Examiner* — Gary Estremsky
(74) *Attorney, Agent, or Firm* — O'Shea Getz P.C.

(57) ABSTRACT

A blind installation pin assembly for a gas turbine engine includes a pin that defines a bore. A paddle mounted to an end of the pin to pivot about a paddle axis between an install position and a lock position. A T-bolt that passes through the bore, a crosspiece of the T-bolt selectively engageable with the paddle.

11 Claims, 11 Drawing Sheets

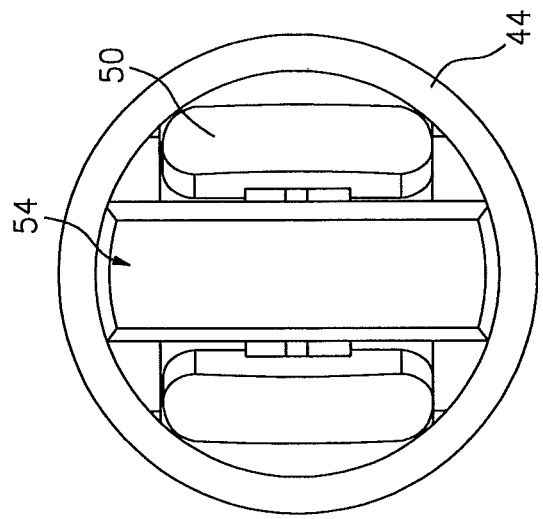
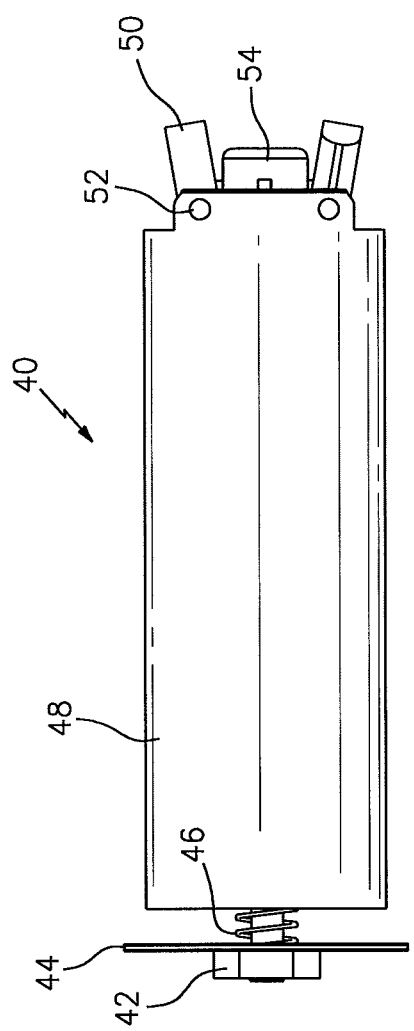
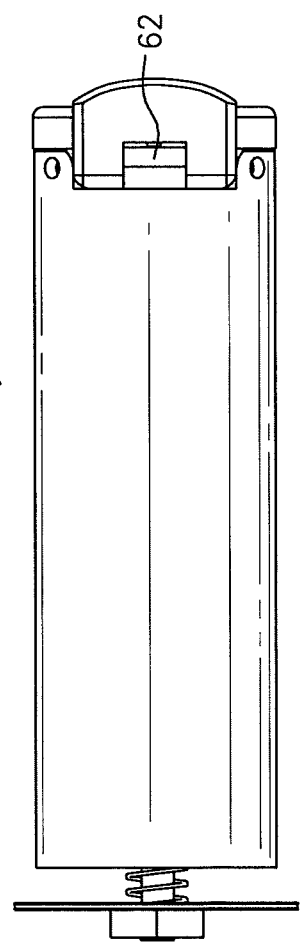
FIG. 6
FIG. 4
FIG. 5

BLIND INSTALLATION PIN FOR A GAS TURBINE ENGINE MOUNT

This application claims priority to U.S. patent application Ser. No. 61/745,732 filed Dec. 24, 2012.

BACKGROUND

The present disclosure relates to a gas turbine engine and, more particularly, to mount pin therefor.

Gas turbine engines are mounted to transmit loads between the engine and aircraft structure. The loads typically include the weight of the engine, thrust, aerodynamic loads, maneuver loads, and rotary torque about the engine axis. The engine mount also absorbs the deformations to which the engine is subjected during different flight phases and the dimensional variations due to thermal expansion and retraction.

One conventional engine mounting configuration includes a pylon having a forward mount and an aft mount. The front mount handles the thrust load from the engine as well as vertical and side loads from the front of the engine. The rear mount handles vertical and side loads from the rear of the engine and the engine torque. The interface between each mount and the engine case structure is typically achieved with a respective mount pin. In some mount architectures, the mount pin is accessible from only one direction and requires blind assembly.

SUMMARY

A blind installation pin assembly for a gas turbine engine according to one disclosed non-limiting embodiment of the present disclosure includes a pin that defines a bore, a paddle mounted to an end of said pin to pivot to pivot about a paddle axis between an install position and a lock position, and a T-bolt that passes through said bore, a crosspiece of said T-bolt selectively engageable with said paddle.

In a further embodiment of the foregoing embodiment, the T-bolt is spring biased.

In a further embodiment of any of the foregoing embodiments, the T-bolt is axially movable and rotatable within said bore.

In a further embodiment of any of the foregoing embodiments, the blind installation pin includes a washer and nut threaded to a threaded section of said T-bolt opposite said paddle.

In a further embodiment of any of the foregoing embodiments, the washer defines a diameter greater than said pin.

In a further embodiment of any of the foregoing embodiments, the paddle extends beyond a periphery of said pin in said lock position.

In a further embodiment of any of the foregoing embodiments, the crosspiece includes a groove engageable with a locator for said install position and a locator for said lock position.

In a further embodiment of any of the foregoing embodiments, the T-bolt includes a bolt welded to said crosspiece.

A blind installation pin assembly for a gas turbine engine according to another disclosed non-limiting embodiment of the present disclosure includes a pin that defines a bore, a set of paddles mounted to an end of said pin to pivot about respective paddle axes between an install position and a lock position, a T-bolt that passes through said bore, a crosspiece of said T-bolt selectively engageable with said set paddles, a spring which biases said crosspiece toward said set of paddles, a washer mounted to said T-bolt adjacent a washer end of said pin opposite said set of paddles, and a nut threaded to a threaded segment of said T-bolt adjacent to said washer.

In a further embodiment of the foregoing embodiment, the crosspiece rotationally engages said set of paddles. In the alternative or additionally thereto, in the foregoing embodiment the crosspiece includes a groove engageable with a locator for said install position and a locator for said lock position. In the alternative or additionally thereto, in the foregoing embodiment the washer defines a diameter greater than said pin. In the alternative or additionally thereto, in the foregoing embodiment the nut is threaded onto said threaded segment into contact with said washer to lock said crosspiece to said locator for said lock position.

A method of mounting a gas turbine engine to an engine support structure according to another disclosed non-limiting embodiment of the present disclosure includes pressing and rotating a T-bolt into a pin in the engine support structure, and pivoting at least one paddle to a lock position substantially against the T-bolt so as to rotatably lock the T-bolt thereat, thereby locking the T-bolt within the pin.

In a further embodiment of the foregoing embodiment, the pressing step overcomes a spring bias.

In a further embodiment of any of the foregoing embodiments, the method includes locking the paddle in the lock position.

In a further embodiment of any of the foregoing embodiments, the method includes tightening a nut onto the T-bolt to secure the paddle in the lock position.

In a further embodiment of any of the foregoing embodiments, the step of pivoting at least one paddle includes pivoting plural paddles to a lock position against respective opposing surfaces of the T-bolt.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 4 is a top view of the blind installation pin;

FIG. 5 is a side view of the blind installation pin;

FIG. 6 is an end view of the blind installation pin;

DETAILED DESCRIPTION

Figure 1:
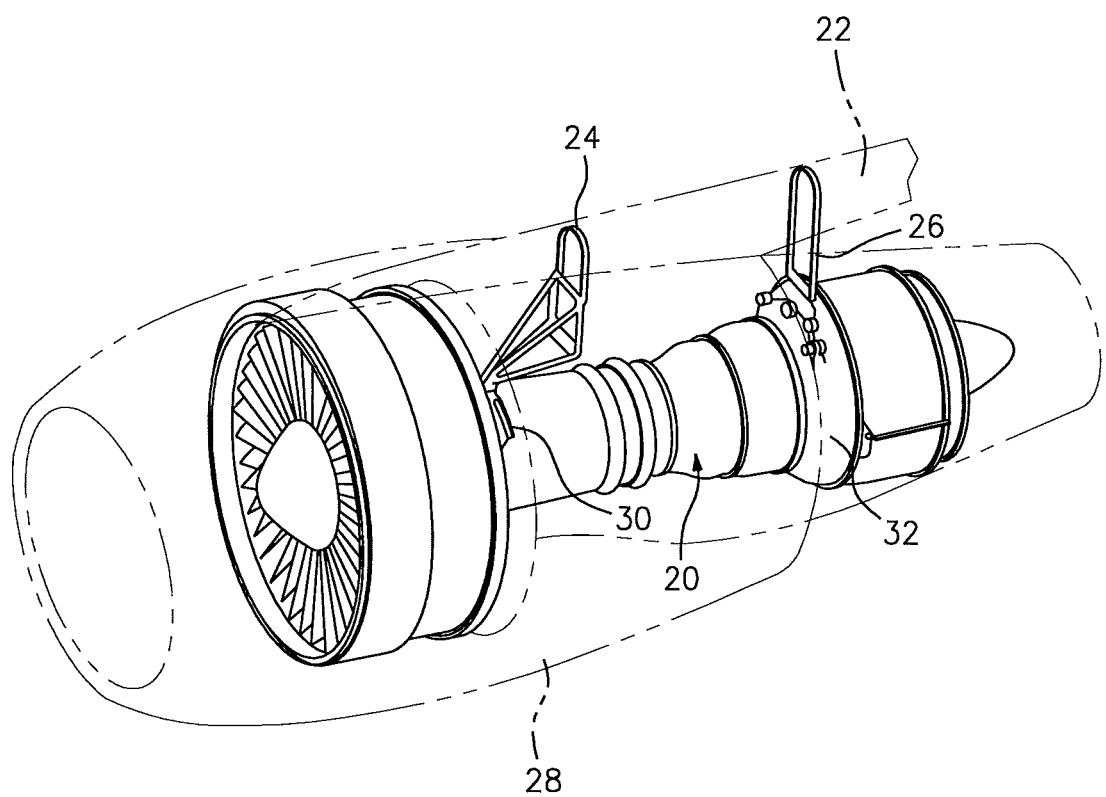
FIG. 1 is a general schematic partial fragmentary view of a gas turbine engine suspended from an engine pylon.

FIG. 1 schematically illustrates a gas turbine engine 20 suspended from an engine pylon 22 by a front mount 24 and an aft mount 26. The engine pylon 22 or other support structure is typically mounted to an aircraft wing, however, the engine pylon 22 may alternatively extend from other aircraft structure such as an aircraft empennage. The engine 20 is mounted within an engine nacelle assembly 28 as is typical of an aircraft designed for subsonic operation. The front mount 24 is attached to the engine 20 at an intermediate case 30 and the aft mount 26 is attached to the engine 20 at a turbine case 32. It should be appreciated that the mounted structure is schematic and simplified.

Figure 2:
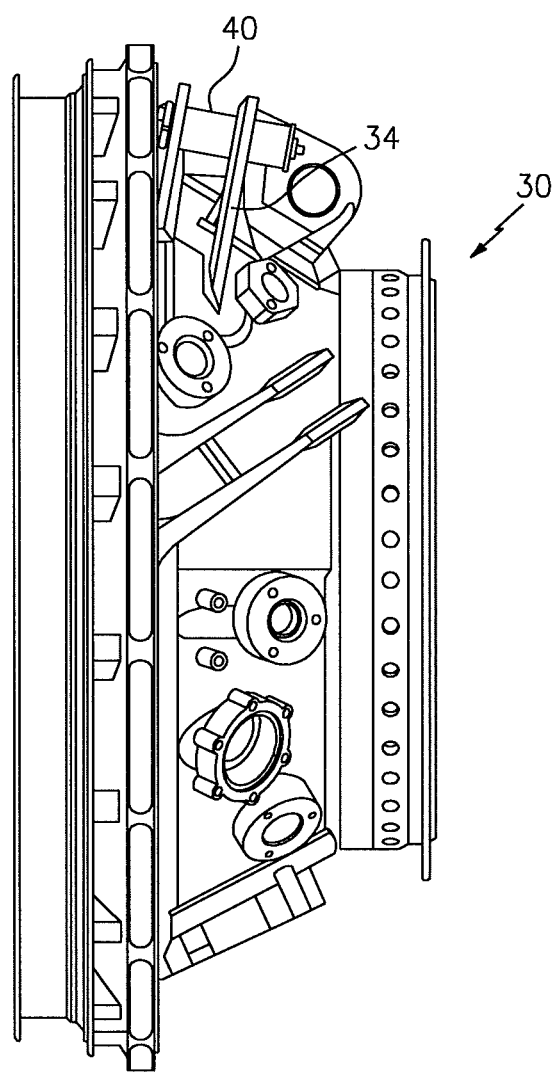
FIG. 2 is an expanded view of an intermediate case with a blind assembly requirement.
Figure 3:
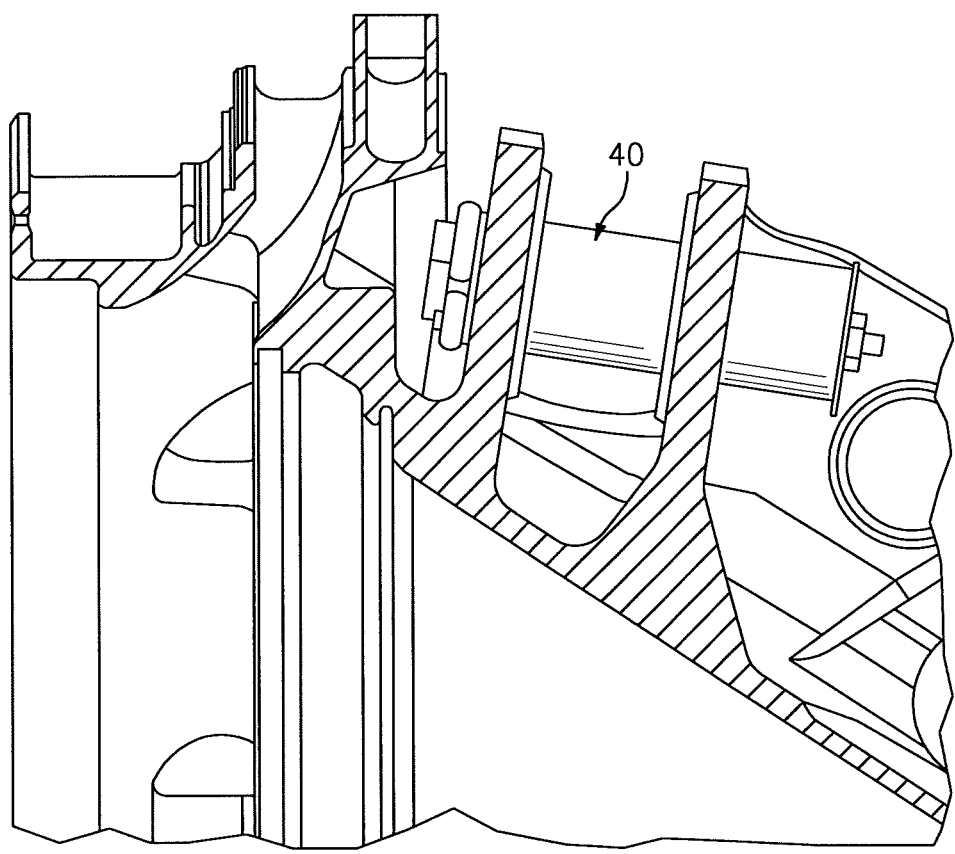
FIG. 3 is an expanded view of the intermediate case blind installation pin.

With reference to FIG. 2, the front mount 24 is attached to the intermediate case 30 at a clevis 34 with a blind installation pin assembly 40. In this disclosed non-limiting embodiment, the blind installation pin assembly 40 is accessible from only one side (FIG. 3). That is, the blind installation pin assembly 40 requires unidirectional installation.

With reference to FIGS. 4-6, the blind installation pin assembly 40 generally includes a nut 42, a washer 44, a spring 46, a pin 48, a set of paddles 50, paddle pins 52 and a T-bolt 54. The washer 44 defines a diameter greater than the pin 48 and, with the paddles 50 extended, axially locks the blind installation pin assembly 40 in the clevis 34. The pin 48 reacts the transverse forces and experiences minimal—if any—axial loading. That is, the pin 48 is the primary load-carrying member and in the disclosed non-limiting embodiment is approximately 1" (25 mm) in diameter. It should be appreciated that various diameters may alternatively benefit herefrom.

Figure 7:
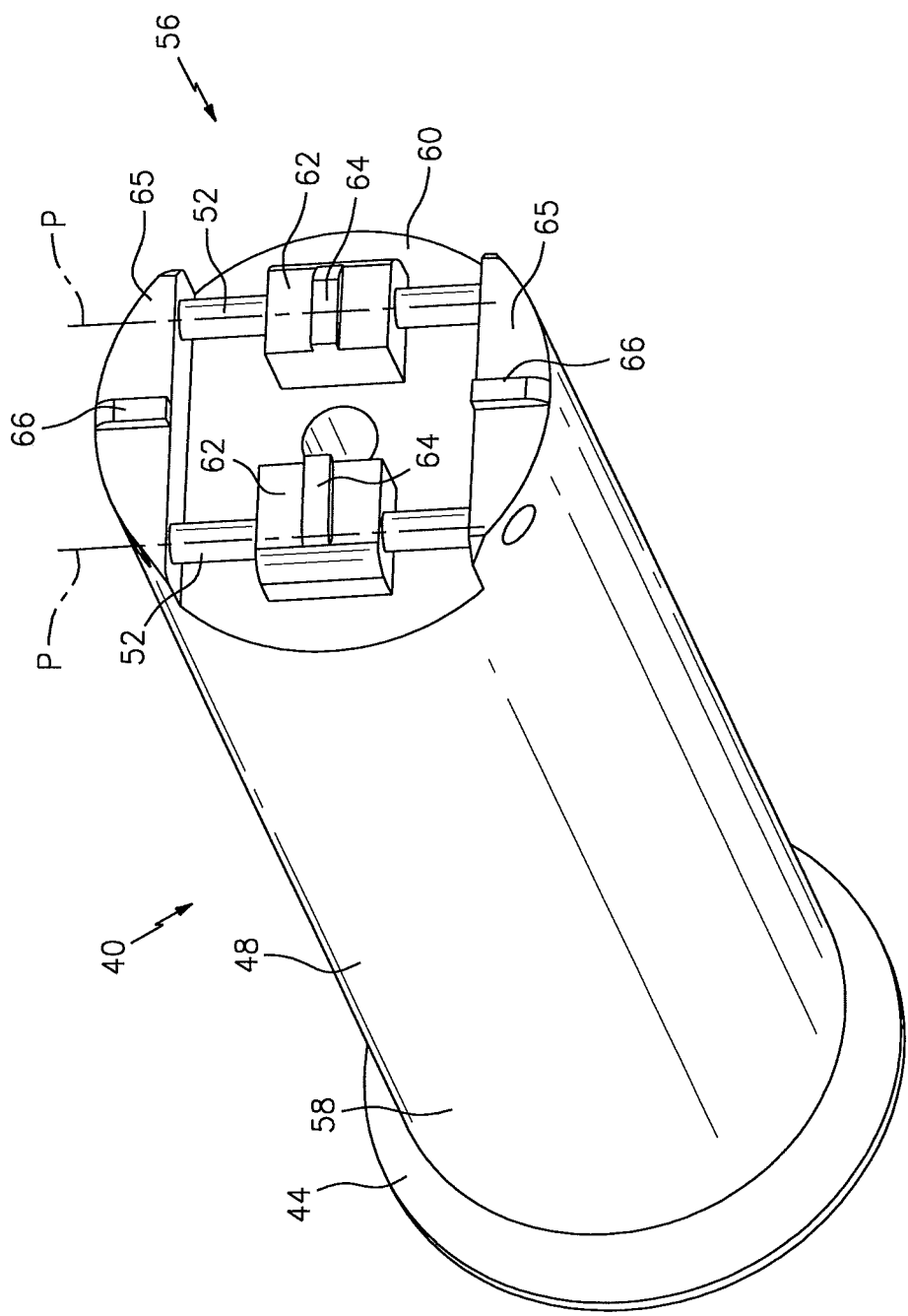
FIG. 7 is perspective end view of a blind installation pin assembly with paddles and T-Bolt removed for blind pin detail.

With reference to FIG. 7, a paddle end 56 of the pin 48 opposite a washer end 58 defines a slot 60 across which the paddle pins 52 are mounted. Supports 62 within the slot 60 also support the paddle pins 52 and are at least partially surrounded by the paddles (FIGS. 4-6). That is, a pin axis P for each paddle pin 52 is perpendicular to the slot 60. A support locator 64 is located along each support 62 and parallel to the slot 60. A side 65 of each slot 60 also includes a pin locator 66 between and parallel to the pin axes P. That is, the support locator 64 is perpendicular to the pin locator 66.

Figure 8:
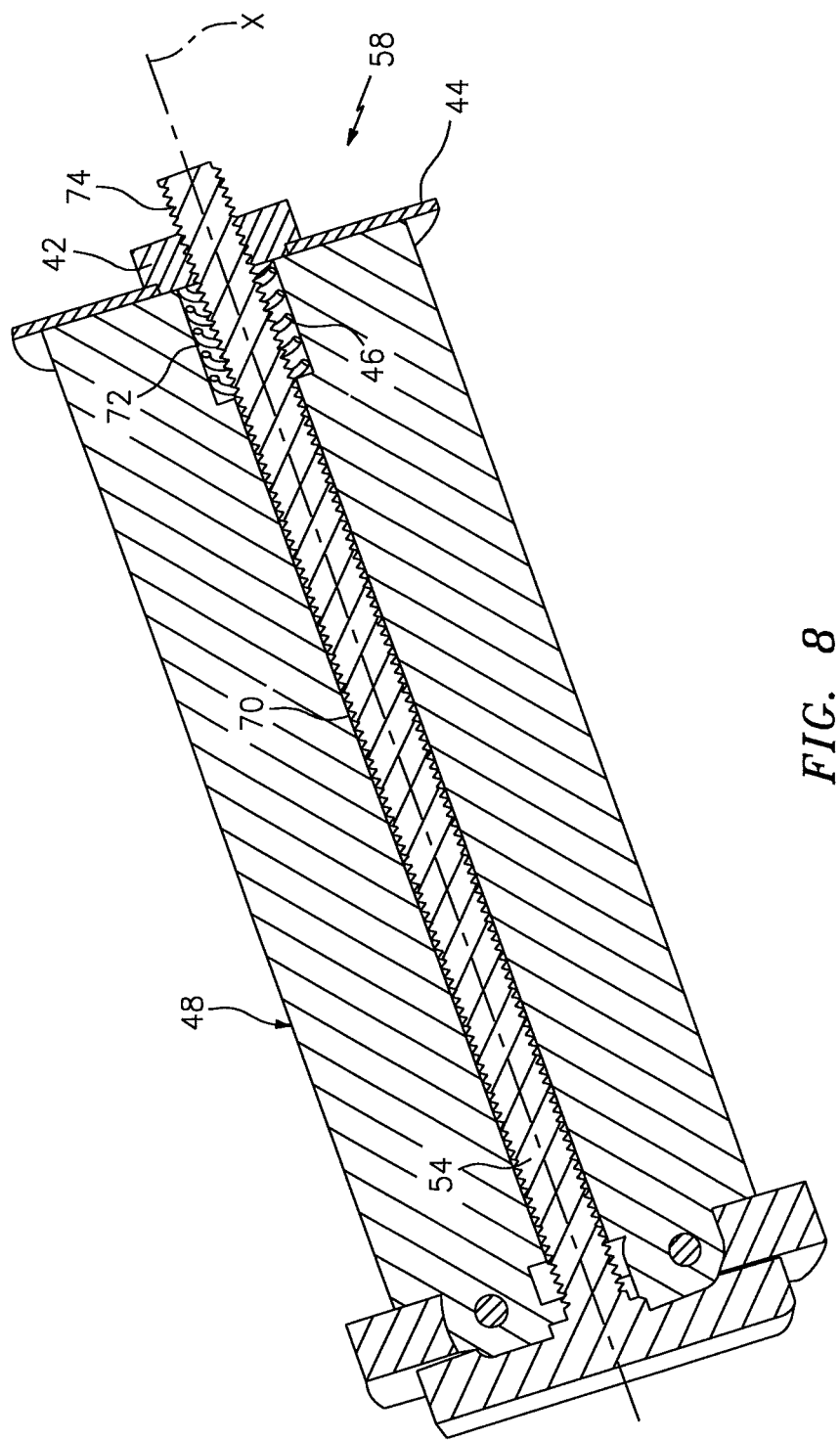
FIG. 8 is a longitudinal cross-section of the blind installation pin assembly according to one disclosed non-limiting embodiment.

With reference to FIG. 8, the pin 48 defines a bore 70 through which the T-bolt 54 is slidably and rotationally mounted along a pin axis X. An increased diameter bore portion 72 at the washer end 58 receives the spring 46 to react against the washer 44. The nut 42 is received on a threaded segment 74 of the T-bolt 54 adjacent to the washer 44. The threaded segment 74 may extend for the entire length or only a portion of the length of the T-bolt 54.

Figure 9:
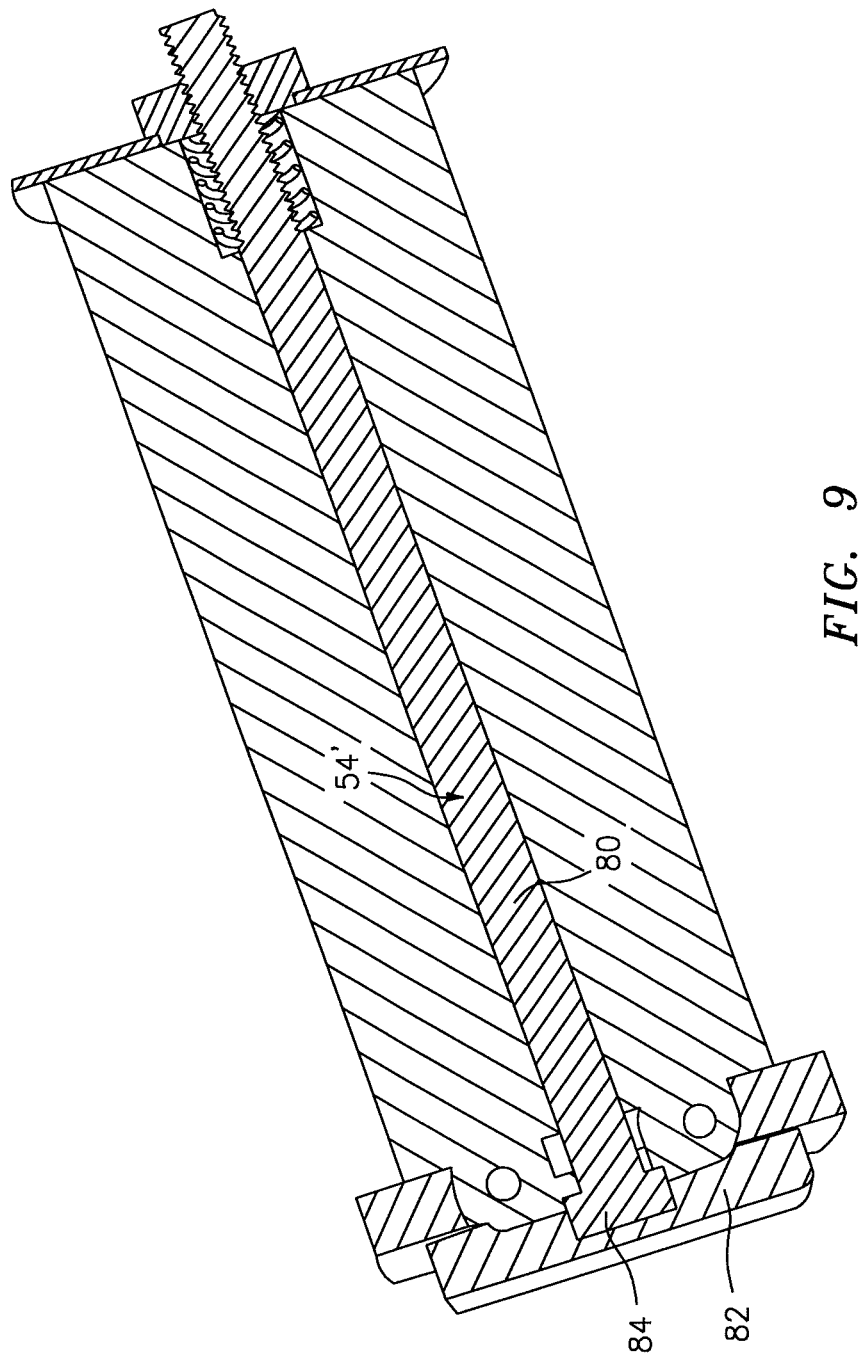
FIG. 9 is a longitudinal cross-section of the blind installation pin assembly according to another disclosed non-limiting embodiment.

In another disclosed non-limiting embodiment, the T-bolt 54 may include a multiple of components such as a standard aerospace fastener 80 welded or otherwise attached to a crosspiece 82. That is, a bolt head 84 of the fastener 80 may be welded within the crosspiece 82 (FIG. 9).

Figure 10:
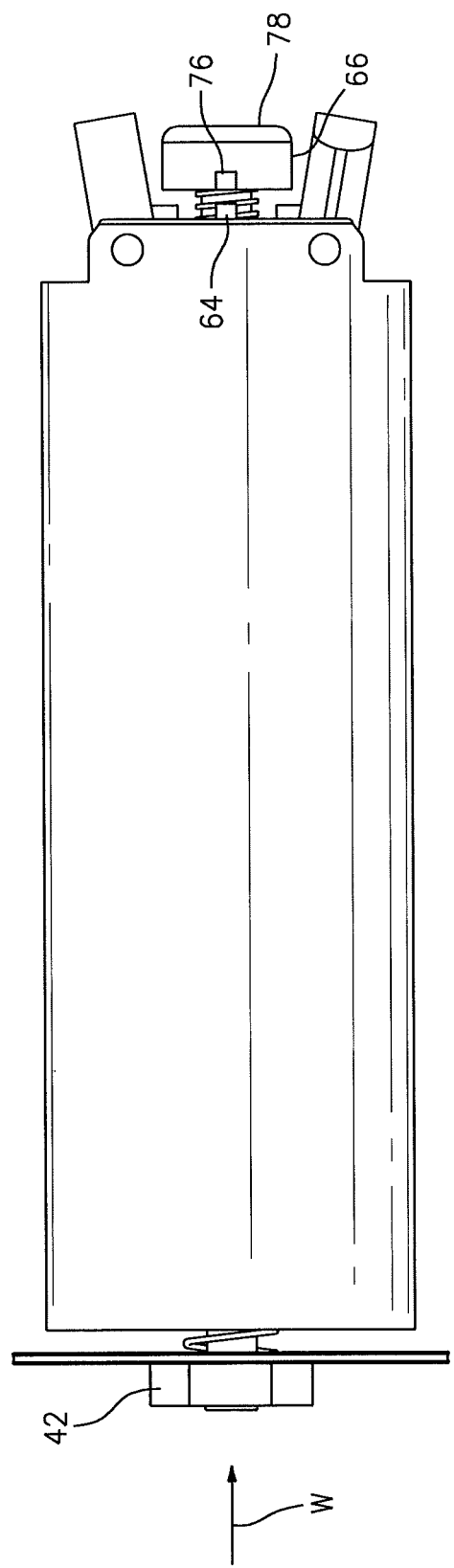
FIG. 10 is a top view of the blind installation pin assembly with a force being applied to the T-bolt.

Axial pressure (illustrated schematically by arrow W) applied to the nut 42 against bias of the spring 46 slides the T-bolt 54 through the bore 70 to lift a groove 76 in a crosspiece 78 of the T-bolt 54 off the locators 64, 66 (FIG. 10). That is, the crosspiece 78 of the T-bolt 54 is biased toward the paddle end 56 by the spring 46. The support locators 64 define a lock position for the pin 48 and the pin locators 66 define an install position for the pin 48 (FIG. 10). That is, the locators 64, 66 rotationally lock the T-bolt 54 to facilitate rotation of the nut 42.

With reference to FIG. 10, the crosspiece 78 of the T-bolt 54 is positioned on the pin locators 66 at the install position for the pin 48 (also shown in FIGS. 4-6). The blind installation pin assembly 40 is thereby readily installed in the clevis 34 under unidirectional or blind installation conditions.

Figure 11:
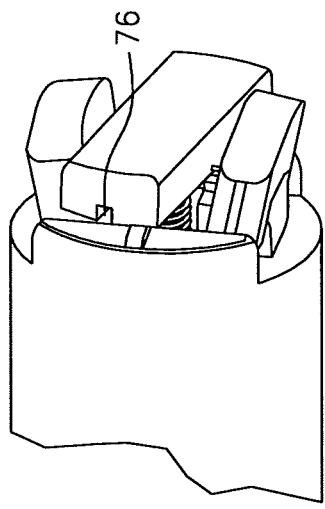
FIGS. 11-15 are sequential views of the T-bolt being rotated toward a locked position.
Figure 12:
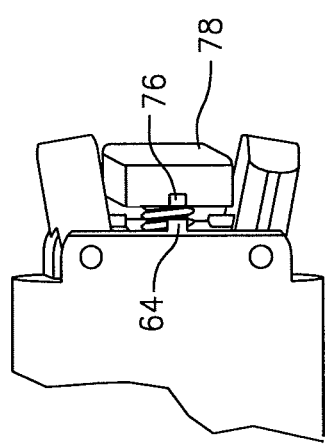
Figure 15:
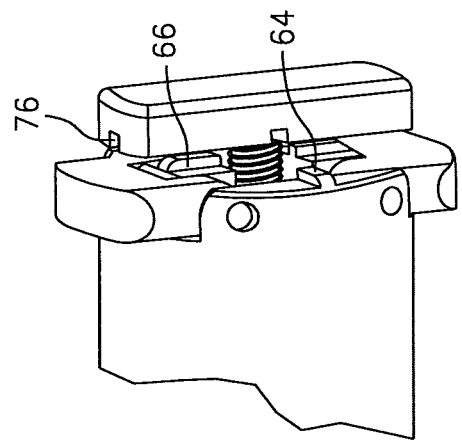
Figure 14:
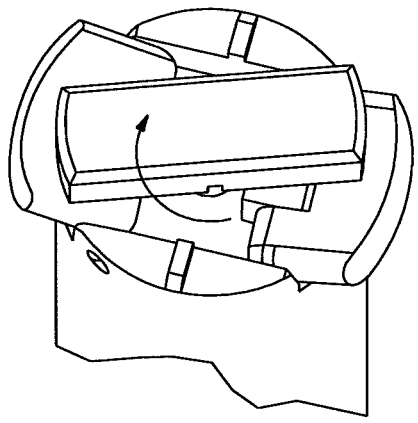
Figure 13:
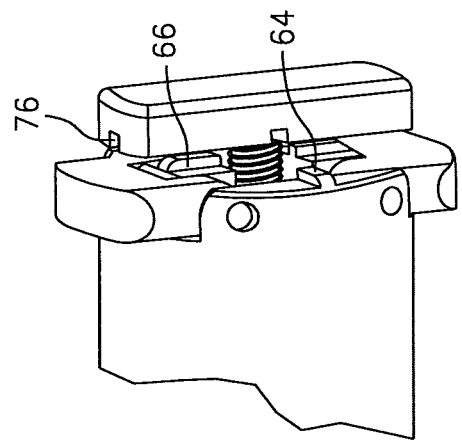

Once the blind installation pin assembly 40 is installed in the clevis 34, axial pressure is applied to the nut 42 to overcome the bias of the spring 46 to slide the T-bolt 54 through the bore 70 and lift the groove 76 in the crosspiece 78 of the T-bolt 54 off the pin locators 66 (FIGS. 10-11).

Figure 16:
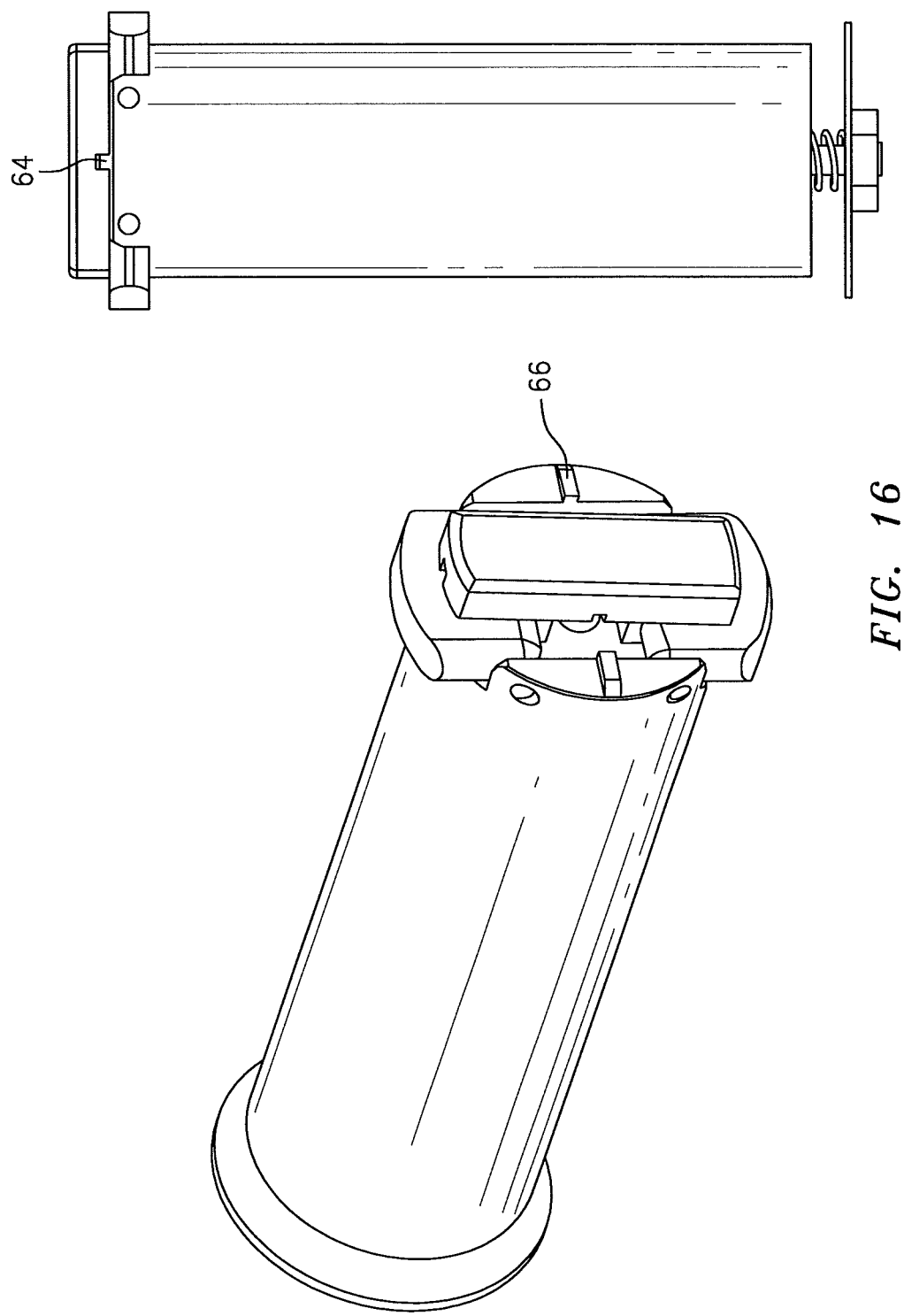
FIG. 16 is a top view of the T-bolt in a locked position.
Figure 17:
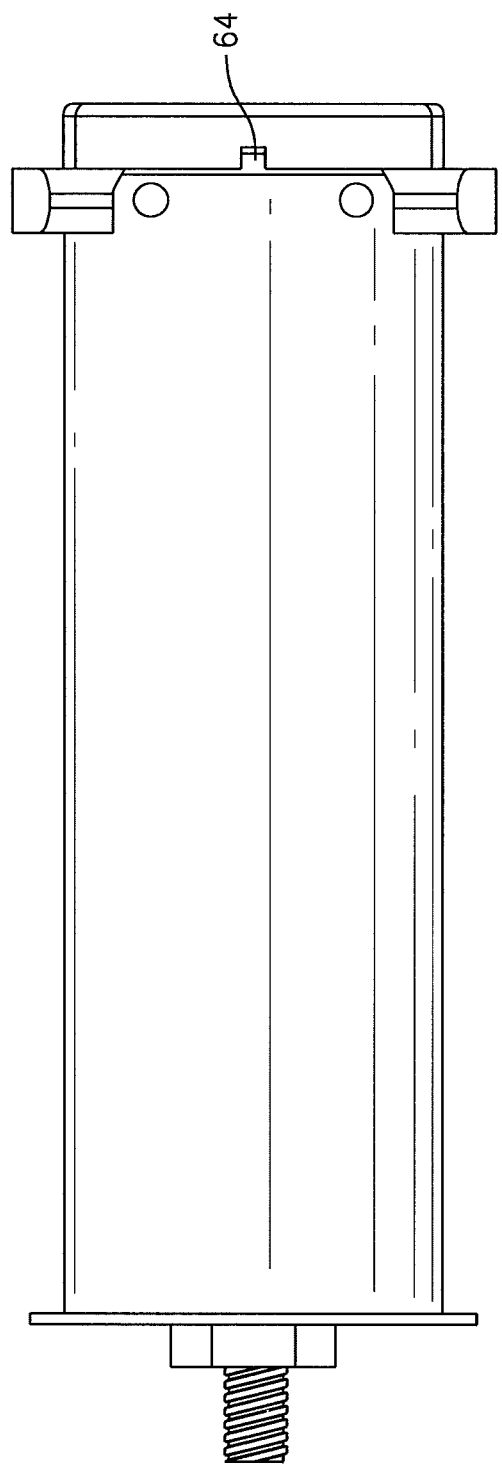
FIG. 17 is a top view of the T-bolt secured in the locked position.

The crosspiece 78 of the T-bolt 54 is then rotated to contact the paddles 50 and pivot the paddles 50 about the paddle pins 52 to the lock position at which the paddles 50 extend beyond a periphery of the pin 48 (FIGS. 12-15). That is, the paddles 50, like the washer 44 extends beyond the diameter of the pin 48 to axially lock the pin 48 within the clevis 34. The groove 76 in the crosspiece 78 of the T-bolt 54 is then positioned on the support locators 64 to overlay the paddles 50 (FIG. 16). The nut 42 is then tightened on the threaded segment 74 to axial restrain and lock the T-bolt 54 FIG. 17).

The blind installation pin assembly 40 is uncomplicated, reliable and robust with a redundant threaded lock interface.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements thruout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A blind installation pin assembly for a gas turbine engine, comprising:
  a pin that defines a bore;
  a paddle mounted to an end of said pin to pivot about a paddle axis between an install position and a lock position;

a T-bolt that passes through said bore, a crosspiece of said T-bolt selectively engageable with said paddle; and a washer and a nut threaded to a threaded section of said T-bolt opposite said paddle, wherein said washer defines a diameter greater than said pin.

2. The blind installation pin assembly as recited in claim 1, wherein said T-bolt is spring biased.

3. The blind installation pin assembly as recited in claim 1, wherein said T-bolt is axially movable and rotatable within said bore.

4. The blind installation pin assembly as recited in claim 1, wherein said paddle extends beyond a periphery of said pin in said lock position.

5. The blind installation pin assembly as recited in claim 1, wherein said crosspiece includes a groove engageable with a locator for said install position and a locator for said lock position.

6. The blind installation pin assembly as recited in claim 1, wherein said T-bolt includes a bolt welded to said crosspiece.

7. A blind installation pin assembly for a gas turbine engine, comprising:

a pin that defines a bore;

a set of paddles mounted to an end of said pin to pivot about respective paddle axes between an install position and a lock position;

a T-bolt that passes through said bore, a crosspiece of said T-bolt selectively engageable with said set paddles;

a spring which biases said crosspiece toward said set of paddles;

a washer mounted to said T-bolt adjacent a washer end of said pin opposite said set of paddles; and a nut threaded to a threaded segment of said T-bolt adjacent to said washer, wherein said crosspiece rotationally engages said set of paddles, and wherein said crosspiece includes a groove engageable with a locator for said install position and a locator for said lock position.

8. The blind installation pin assembly as recited in claim 7, wherein said washer defines a diameter greater than said pin.

9. The blind installation pin assembly as recited in claim 8, wherein said nut is threaded onto said threaded segment into contact with said washer to lock said crosspiece to said locator for said lock position.

10. A blind installation pin assembly for a gas turbine engine, comprising:

a pin that defines a bore;

a paddle mounted to an end of said pin to pivot about a paddle axis between an install position and a lock position; and a T-bolt that passes through said bore, a crosspiece of said T-bolt selectively engageable with said paddle, wherein said crosspiece includes a groove engageable with a locator for said install position and a locator for said lock position.

11. A blind installation pin assembly for a gas turbine engine, comprising:

a pin that defines a bore;

a paddle mounted to an end of said pin to pivot about a paddle axis between an install position and a lock position; and a T-bolt that passes through said bore, a crosspiece of said T-bolt selectively engageable with said paddle, wherein said T-bolt includes a bolt welded to said crosspiece.

* * * * *